United States Patent [19]

Fachinetti et al.

[11] Patent Number: 4,727,450

[45] Date of Patent: Feb. 23, 1988

[54] TEMPERATURE MEASURING, PROTECTION AND SAFETY DEVICE, THERMAL PROTECTION DEVICE USING THE TEMPERATURE MEASURING DEVICE AND ELECTRONIC POWER CONTROLLER USING THE THERMAL PROTECTION DEVICE

[75] Inventors: François Fachinetti, Valence; Claude Neveu, Saint Peray, both of France

[73] Assignee: Crouzet, Paris, France

[21] Appl. No.: 862,507

[22] Filed: May 12, 1986

[30] Foreign Application Priority Data

May 13, 1985 [FR] France ................................ 85 07344

[51] Int. Cl.[4] .............................................. H02H 5/04
[52] U.S. Cl. ........................................ 361/103; 361/18; 323/285; 323/907
[58] Field of Search .................. 361/18, 103; 363/51, 363/52, 53, 55, 56, 54; 323/907, 284, 285

[56] References Cited

U.S. PATENT DOCUMENTS

| | | | |
|---|---|---|---|
| 3,622,849 | 11/1971 | Kelley, Jr. et al. | 361/103 X |
| 4,052,744 | 10/1977 | Boothman et al. | 361/103 |
| 4,117,527 | 9/1978 | Demarest et al. | 361/103 |
| 4,330,809 | 5/1982 | Stanley | 361/103 |

FOREIGN PATENT DOCUMENTS

2528767  5/1976  Fed. Rep. of Germany .

Primary Examiner—A. D. Pellinen
Assistant Examiner—H. L. Williams
Attorney, Agent, or Firm—Jacobs & Jacobs

[57] ABSTRACT

A device is provided for the temperature measurement and thermal protection of an object and more particularly of an electronic "solid state" circuit, using an analog network representative of a thermal model of the circuit to be protected. It comprises, on the one hand, an initialization device for, at the time of switching on, positioning the state of the thermal model at an operating point representative of the real temperature of the object to be protected and, on the other hand, elements isolating the analog network thus allowing it to be representative of the real thermal state of the circuit to be protected, whatever the state of the circuits internal to said device. The device is appropriate for thermal protection of an electronic power controller.

11 Claims, 8 Drawing Figures

TEMPERATURE MEASURING, PROTECTION AND SAFETY DEVICE, THERMAL PROTECTION DEVICE USING THE TEMPERATURE MEASURING DEVICE AND ELECTRONIC POWER CONTROLLER USING THE THERMAL PROTECTION DEVICE

BACKGROUND OF THE INVENTION

The present invention relates to a device for simulating with great precision and for a wide range of applications, the thermal state of an object which is the seat of energy dissipation.

This device is particularly interesting in all the cases where the direct measurement of the temperature of the object is not possible because of its physical characteristics or because of the speed of change of this temperature.

This device for measuring the temperature of a given point of an object finds more particularly interesting applications in the thermal protection of semi conductor devices such as static relays or electronic power controllers (EPC) which may have high dissipation under stable or transitory operating conditions.

It is in fact known that temperature measurements are difficult to make particularly in the cases where:

the temperature probe disturbs the thermal state of the object to be measured.

the object to be measured is physically inaccessible.

the distance between the point to be measured and the thermometer introduces errors and delays, this being particularly true for the measurements of the temperature of semiconductor junctions where it is impossible to implant a thermometer at the level of the junction itself.

the means to be used are unsuitable for many applications.

A first improvement of these temperature measurements is obtained by the simultaneous use:

of a conventional temperature probe situated at a given distance from the point whose temperature it is desired to measure.

of a model representative of the temperature differences between the temperature probe and the point at which the temperature is to be measured.

of information concerning the powers dissipated in the device to be protected, which information is very often obtained readily by electric current and/or voltage measurements.

The principle of such a device for simulating the thermal state of an object has already been described by the inventors in a communication related to a thermal transmission model and presented during the fourt ESTEC Seminar (Spacecraft Power Conditioning Seminar) which took place in September 1982 at Noordwijk (Netherlands).

Since the discovery of this model, new and very important improvements hae been made to this device making it usable in practice with very good performances in all possible conditions of use.

Thus the present invention relates to a temperature measuring, protection and safety device using a model of the thermal transmission between the object or point to be protected and the point where the temperature is measured, comprising an initialization device for, at the time of switching on or of switching on again, positioning the sate of the thermal model at an operating point representative of the real temperature of the object to be protected, initialization being effected by preloading in a very short time a series of capacitors up to a potential representative of the measured temperature.

The present invention also relates to a thermal protection device for a "solid-state" electronic circuit, using the measuring device of the invention, with an analog network representative of a thermal model of the circuit to be protected, means being provided for isolating the analog network and thus allowing it to be representative of the thermal state of the circuit to be protected, whatever the electric state of the upstream circuits and of the circuits internal to said device.

The present invention relates furthermore to an electronic power controller, including a thermal protection device of the invention and further comprising several electronic "solid state" circuits with their individual control circuits, said "solid state" electronic circuits being connected in parallel.

DESCRIPTION OF THE DRAWINGS

The component elements of the invention are illustrated by the following description with reference to the following accompanying figures.

This network delivers the voltage VS proportional to the instantaneous temperature $\theta_S$ of the object to be protected.

This initialization device of the analog network 14 is shown by the reference 15 in this example.

DESCRIPTION OF THE PREFERRED EMBODIMENTS

According to the principles outlined above, the simulator of the thermal state of an object uses the analogies existing between the laws which govern the thermal and electric flows. The fundamental equations of the science of heat and electricity:

$$-d\ Q_T = Pdt = mCd\theta;\ R_T = (d\theta/dt)$$

$$-d\ Q_e = idt = CedV; Re = (dV/dt)$$

show the analogy between the following magnitudes:

| Thermal energy | $Q_T$ | ⟷ | Electric load | $Q_e$ |
| Thermal Power | P | ⟷ | Current | i |
| Heat capacity | mC | ⟷ | Capacity | $C_e$ |
| Thermal resistance | $R_T$ | ⟷ | Resistance | $R_e$ |
| Temperature | θ | ⟷ | Voltage | V |
| Time | t | ⟷ | Time | t |

This analogy may be used for knowing the temperature $\theta_S$ of an object or of a point of a dissipating object which does not leand itself to direct measurement (change too rapid, physical inaccessibility, etc). We have shown that the temperature $\theta_S$ is perfectly determined by the knowledge:

of the instantaneous power P dissipated at the level of the dissipation zone ZD of the object;

of the temperature $\theta_M$—at point PP of the thermal discharge path of the energy dissipated at ZD, accessible to direct measurement;

of the thermal characteristics (thermal resistances and heat capacities) of the thermal connection existing between ZE and PP.

of the initial thermal state.

Figure 1:
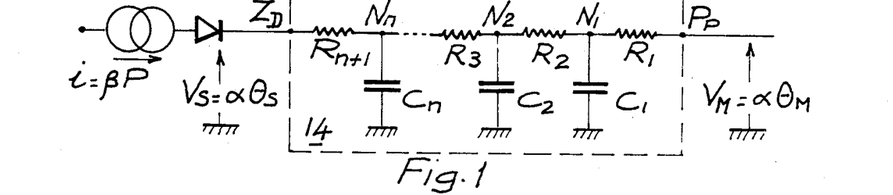
FIG. 1 shows the general diagram of the analogue process used in the invention and comprising the thermal model formed by means of network 14, fed with the voltage VM proportional to the measured temperature $\theta_M$ and the current i proportional to the instantaneous power P dissipated in the object to be protected.

Because of the analogies between thermal and electric phenomena $\theta_S$ may be simulated electrically using an analog processor (FIG. 1) in which:

the RC network is the electric analog of the thermal resistances and heat capacities of the thermal connection existing between ZE and PP.

The diode D simulates the fact that the energy dissipated at ZE can be discharged by the thermal chain;

VW is a voltage, applied to the network, proportional (coefficient of proportionality α) to the temperature $\theta_M$ measured at PP;

is a current proportional (coefficient of proportionality β) to the instantaneous power p dissipated at ZD, the voltage VS is the desired result and corresponds to the electric measurement of the desired temperature $\theta_S$, except for the coefficient α.

One of the essential difficulties in using such an analog processing device is to initialize it, that is to say to fix the electric state of the analog processor so that, on switching on, it is effectively representative of the thermal state of the device to be protected. In a large number of applications, this initialization problem is not taken into consideration because it is not critical, but it may in some cases cause important errors of the simulated temperature, and for significant periods of time.

In fact, when the analog processor is switched on, the voltages $VN_i$ at the terminals of the capacities are zero, whereas VM is not necessarily so. These voltages will change toward VM, with time constants dependent on the RC network which may be considerable. Thus, the information VS concerning the temperature is only correct after a period of time corresponding to several times the largest of the time constants.

For a number of applications, this delay is prohibitive.

By avoiding these disadvantages the device of the invention allows not only excellent measuring precision to be obtained as soon as the analog processor is switched on, but also provides a safeguard in all cases, that is to say that if an error occurs at the time of initialization of the analog processor, the temperature $\theta_S$ is never under estimated; this ensures safety. These performances are obtained by two complementary means consisting of an electronic initialization circuit which fixes in a very short time the voltage $VN_i$ of the nodes Ni at the voltage VM at the time of switching on, and adequate sequencing of cutting off the electric supply to the circuits of the analog processor.

Figure 2:
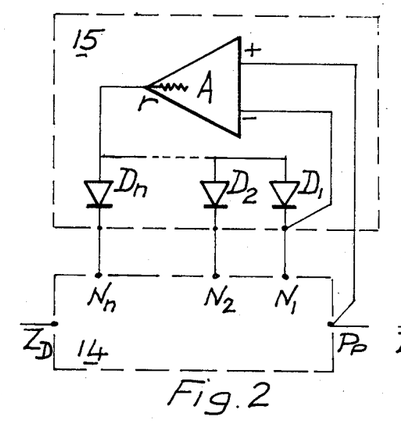
FIG. 2 is a first embodiment of a device in accordance with the invention for guaranteeing that the temperature $\theta_S$ calculated in the analogue network 14 of FIG. 1 is at all times representative of the real temperature of the object to be protected.

A first general diagram illustrating one embodiment of the initialization device of the analog processor is shown in FIG. 2.

In this diagram, the initialization device is formed by an operational amplifier A, with output impedance by an operational amplifier A, with output the terminals of the resistor $R_1$ and whose output feeds the capacitors $C_1$ to $C_n$ through the diodes $D_1$ to $D_n$.

On switch on, the operation is as follows: the voltage VM is established very rapidly with the time constant of the electronics of the voltage output thermometer, this time constant being hundreds, even thousands of times shorter than that of the RC network. If, at one moment or another, the voltage VM is even very slightly higher than the voltage $VN_1$, taking into account the considerable gain of the operational amplifier, the output voltage of this latter increases so that diodes $D_1$ to $D_n$ begin to conduct and capacitors $C_1$ to $C_n$ are charged with a time constant $rC_i$ which may be chosen as low as required depending on the output characteristics of the operational amplifier with output impedance r.

As long as no current arrives at ZD, the voltages $VN_1$ to $VN_n$ follow the voltage VM with:

the time constant of the $RC_i$ (i=1 to n) network if VM decreases, the time constant $rC_i$, if VM increases.

When a current arrives at ZD, the voltages of the nodes $VN_1$ to $VN_n$ increase and become greater than VM. The output voltage of the operational amplifier decreases, diodes $D_1$ to $D_n$ are reversely biased and the analog network is then isolated from the initialization system. This isolation thus takes place automatically through the diodes $D_1$ to $D_n$, here playing the role of automatic switches.

Another embodiment of the preceding device consists in using, instead of the diodes $D_1$ to $D_n$, controlled switches so that the device has symmetrical operational with respect to the measured temperatures, whether they are increasing or decreasing.

Figure 3:
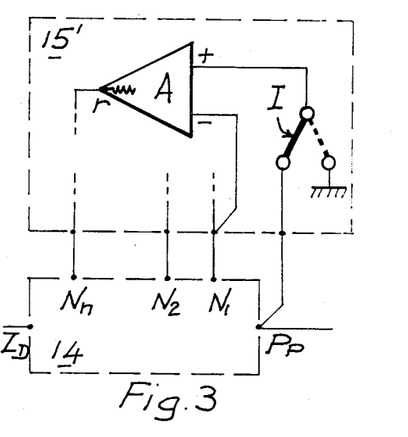
FIG. 3 is a second embodiment which provides initialization of the state of the analog network 14 of FIG. 1, by the use of a controlled swtich I.

The effective isolation may also be controlled by diodes $D_1$ to $D_n$ by using the switch I such as shown in FIG. 3, which shows the part of the initialization device modified with respect to FIG. 2. This switch I puts the + input of the operational amplifier A at a voltage such that the diodes $D_1$ to $D_n$ are reversely biased, that is to say in the open non conducting state, as soon as the initialization properly speaking ends, whose minimum duration is equal to three times the greatest of the time constants r $C_i$, i=1 to n.

The device, in addition to the above described initialization means, comprises means for introducing a delay in the cutting off of the power supply to the analog processor and initialization circuits.

This allows the accuracy of the dynamic measurement of the temperature of the object to be protected to be kept even in the case of a transitory cut off, in of indetermined duration, particularly for the case of short cuts.

The device comprises then sequencing allowing the power supply to the analog processor to be cut off only with a time delay greater than about three times the time constant T of the RC network with respect to the end of the dissipation phase of the object to be protected.

Thus, the analog processor associated with its initialization device always guarantees excellent accuracy dependent of the fact that it is supplied with power or not at the beginning of the dissipation phase, knowing that during the whole of this phase it must obviously be still supplied with power.

In fact, if two consecutive dissipation phases occur and if the beginning of the second takes place less than 3T after the end of the first, the processor is still supplied with power and it has kept the entire memory of the two dissipation phases and of their effects.

In the opposite case, if the beginning of the second dissipation phases takes place after a time delay greater than 3T, after the end of the preceding phase, the processor has lost its power supply for a certain time, so has lost its memory, but reinitialization at the beginning of the second phase consisting in putting all the voltages $VN_1$ to $VN_n$ to the value of the voltage VM simulates reality very accurately.

One of the more particularly interesting applications of the devices for measuring the temperature of an object is the measurement of the operating temperature of semiconductors and, among other things, its application to the thermal protection of static relays and electronic power controllers (EPC).

An EPC is an electronic means for controlling the application to a load of a current, very often a DC current, coming from a power supply source while ensuring efficient protection of the elements present: power supply, electric distribution networks, switch, load. The protection of power supplies, electric networks and loads is provided by limiting the current which passes through said load to a maximum predetermined value (which may be a function of time).

For that, a solid state switch is used formed from one or more semiconductor power components, for example of the MOSFET or bipolar type.

The protection of the switch itself is provided by a circuit breaking system.

Figure 4:
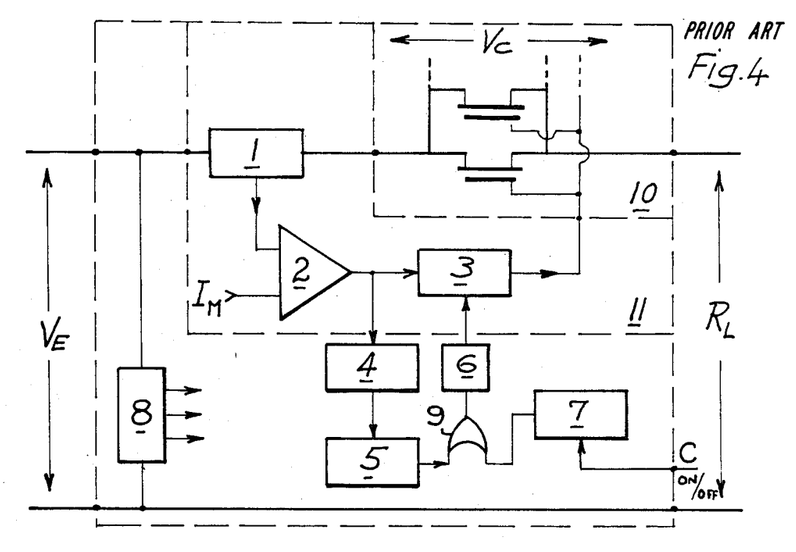
FIG. 4 is the illustration of an electonic power controller, of conventional type corresponding to the prior art, which ensures its protection by limiting the maximum current, and its trip-out by simple time delay.

The operating principle of a conventional EPC is shown in FIG. 4:

The EPC is inserted between the power supply source $V_E$ and the load $R_L$. Its first role is to establish or interrupt the power fed to load $R_L$ by the power supply source $V_E$ as a function of the external control C.

Its second function is to limit the maximum current $I_M$ absorbed by the load.

This latter function requires a certain protection of switch 10, which protection is provided by the time delay functions with automatic trip out.

The switch properly speaking is the switch 10. The current protected switch 11 is typically formed of the switch properly speaking 10 associated with a current sensor 1, an error amplifier 2 comparing the actual current with the fixed maximum value $I_M$ and buffer 2.

Detector 4 detects passage of switch 10 to limiting conditions, the detection triggering off a time delay provided by 5. After a certain time, timer 5 generates a signal which controls with priority buffer 3 through memory 6 storing the state of the switch via gate 9.

The external control C is also applied at gate 9 through the control interface 7.

The internal circuits of the power control are fed by the internal power supply circuit 8 from the power supply source $V_E$.

When the EPC receives a control which enables it (switch 10 saturated), the current through the switch is $I=V_E/R_L$ where $V_E$ is the voltage of the power supply present at the input of the EPC and $R_L$ the load at the output of the EPC. If for any reason, $R_L$ becomes less than $V_M/I_M$ where $I_M$ is the maximum current tolerated at a given moment, the switch begins to operate in linear mode and the current passing through it is slaved to the value $I_M$ because of the action of elements 1, 2 and 3. The power P dissipated in the switch, which was very low in the saturated mode, since it is equal to the product of the normal current I absorbed by the load multiplied by the saturation voltage of the switch, that is often less than 1% of the maximum transmissible power which is equal to $I_M \times V_E$, becomes: $P=I_M (V_E - I_M \times R_L) = I_M \times V_C$. This power is all the higher the smaller R. It is equal to the maximum transmissible power $I_M \times V_E$ for a short circuit ($R_L = 0$).

Moreover, as soon as the current I becomes equal to $I_M$, this state is detected by element 4 which triggers off a timing system 5. If I does not drop below $I_M$ during the period of the time delay, the switch is automatically opened via elements 9 and 6 and the EPC trips out. If not, the timing system 5 is reinitialized.

The maximum admissible period for the time delay depends:

on the voltages present at the input and at the output of the EPC, on the value of the ambient temperature at the time of the overload, on the cooling mode of the device, on the successions of possible overloads passed.

In the conventional EPC, the time delay period is fixed so as to cover the worst cases and determination thereof never integrates all the parameters on which the maximum admissible period depends. The following disadvantages result therefrom:

difficulties for optimizing the capacity of the EPC as a function of a given use, existence of operational restrictions; in other words, the EPC is only protected under specified operating conditions which may change depending on the application, standardization of this type of function is difficult to attain for it induces considerable restrictions in so far as the physical characteristics of the EPC are concerned, such as weight, size and cost.

The radical means of overcoming these problems is to have access to the knowledge of the temperatures of the critical zones of the EPC. In fact, the only parameters which may limit the life of an electronic function, in a voltage and temperature range of use, is the maximum temperature reached by the dissipating components.

It is clear that in the case of an EPC, it is the active zones (junction for the bipolar components, channel for the MOS) of the semiconductor or semiconductors which form the switch, which heat up the most.

Now, the direct measurement of the temperature of these active zones is impossible to achieve simply because of their small volume and so because of their very small thermal time constant (a few microseconds for the active zones properly speaking).

Whence the advantage of using a high speed analog processor formed in accordance with the preceding description for protecting such electronic power controllers.

In this case, the measurement by simulation of the evolution of the temperatures of the dissipation zones (ZD) of the EPC switch allows the thermal security to be ensured, the value of the calculated temperature then being the only and optimum criterion of automatic trip out. The possible parallel association of current limited switching subassemblies (sections) and the use of this criterion give to an EPC thus constructed the following fundamental and unique advantages with reject to prior constructions:

maximum modularity, a wide current capacity range being obtainable from a limited number of standard subassemblies (only the number or the type of section is to be adapted to the application);

a maximum flexibility of use since the only restrictions are to respect the voltage and temperature ranges of use of the power components, very high reliability in use, excellent electric performances in terms of line losses, efficiency, speed due to the new possibility of using sections in parallel comprising power MOSFETs as switches, possibility of hybrid or monolithic technological integration taking into account the acceptable heating up due to the speed of reaction of the thermal control, speed of current control which eliminates the need of using space wasting components for limiting the rate of change of the load current, standardization of the component subassemblies.

Figure 5:
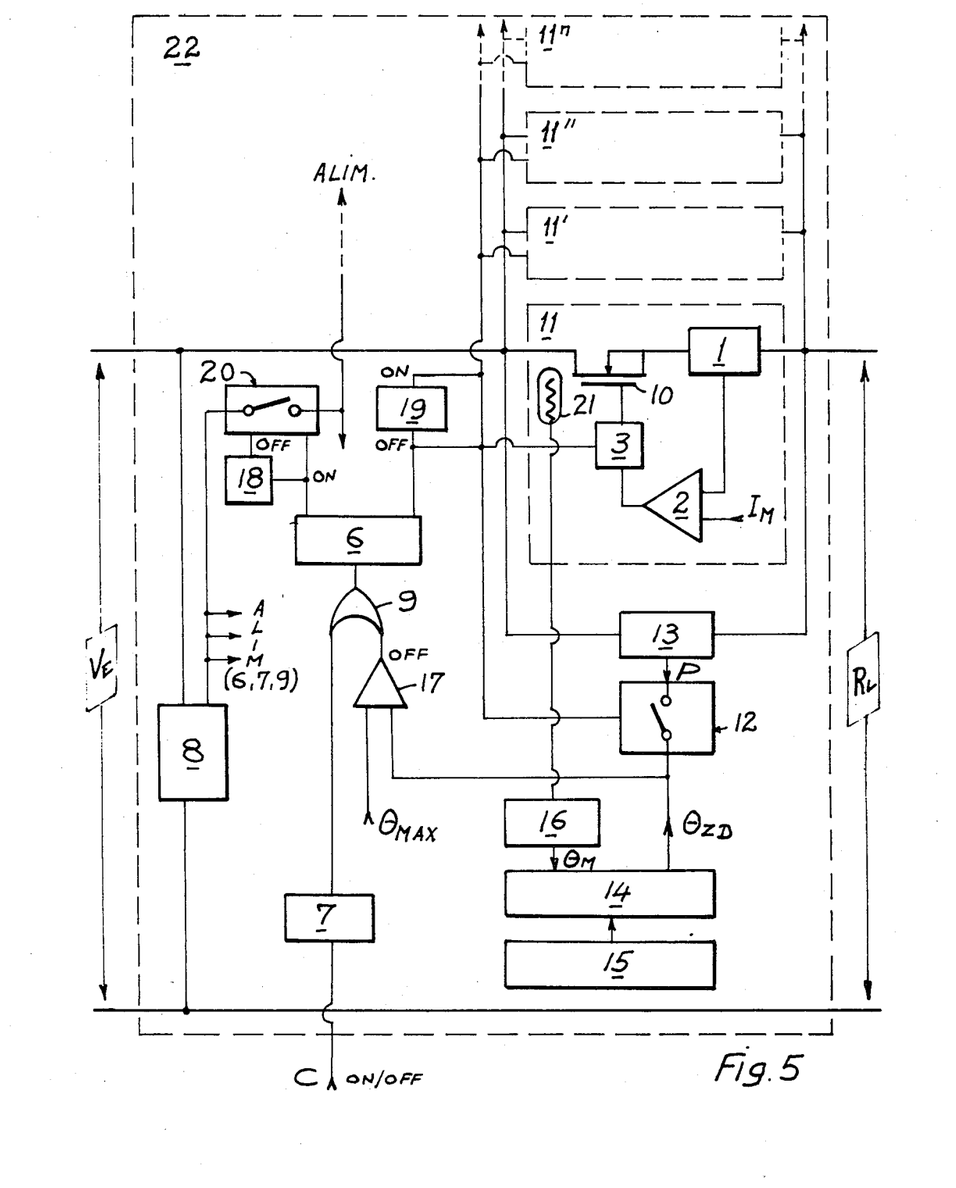
FIG. 5 is the illustration of an electronic power controller protected by the device of the invention comprising one or more power switches 10 of the MOS channel N type.

An EPC in accordance with the invention is shown by way of example in FIG. 5.

Similarly to the conventional EPC of FIG. 4, the EPC of the invention is inserted between a power supply source $V_E$ and a load $R_L$; its role is to establish or interrupt the power fed to load $R_L$ by the power supply source $V_E$ as a function of the external control C. The EPC comprises:

the current limited switch function 11 properly speaking formed by one or more parallel sections, each section being the association of a single field effect transistor FET 10, a current sensor 1, an error amplifier 2 and a buffer 3;

the control function which is ensured by the reception of the external control C properly speaking through the interface 7, by routing 9 this control to a device 6 storing said control.

This device 6 controls the enabled state of sections 11 with a delay determined by the timer 19 and the disabled state of sections 11 without delay, the protection function is ensured by the analog processor 14, put into a state representative of the thermal state of the switch or switches 10 by the initialization device 15, the input parameters of the analog processor being acquired on the one hand by the device 13 measuring the instantaneous power dissipated in the switch or switches 10 and, on the other, by the thermometer formed by the temperature probe 21 and the conversion circuit 16. The instantaneous dissipated power information is routed by switch 12 to the input of the analog processor following the sequence which will be described hereafter.

The temperature information from the analog processor 14 is compared by the comparator 17 with the maximum reference temperature $\theta$.

When this reference value is reached, a priority order for opening switches 10 is sent by 17 via the gate 9 towards the status memory 6.

The electronic circuits providing these functions are fed from the internal power supply source 8; the status memory 6, the interface 7 and gate 9 are permanently supplied with power; the rest of the circuits performing these functions are fed through switch 20; controlled by the status memory 6, this switch 20 closing without delay when the status memory 6 orders enabling of 10 and with a time delay defined by 18 when the status memory orders opening of the switch or switches 10.

Another of the essential characteristics of the invention resides in the method of measuring the instantaneous power dissipated in the element to be protected ZD.

The value of this power, because of the current limitation by the switch or switches 10 is obtained by the single measurement of the voltage drop $V_C$ at the terminals of the sections of the switch. This measurement of the power dissipated in the element to be protected is provided by a voltage-current transformation circuit, embodiments of which are shown in FIGS. 6 and 7.

The current from the voltage-current transformer 13, proportional to the instantaneous power dissipated in the switch or switches, is injected into the analog processor 14. On the other hand, the output of this voltage-current transformer is representative of the power dissipated at ZD only when switch 10 of the EPC is closed. In fact, if it is open, the voltage of the terminals of the switch 10 is maximum, but since the current passing through it is zero, the power which is dissipated therein is also zero. Thus, the power sensor is a voltage-current transformer 13 associated with the electronic switch 12, synchronous with the control of the switch of EPC.

Figure 6:
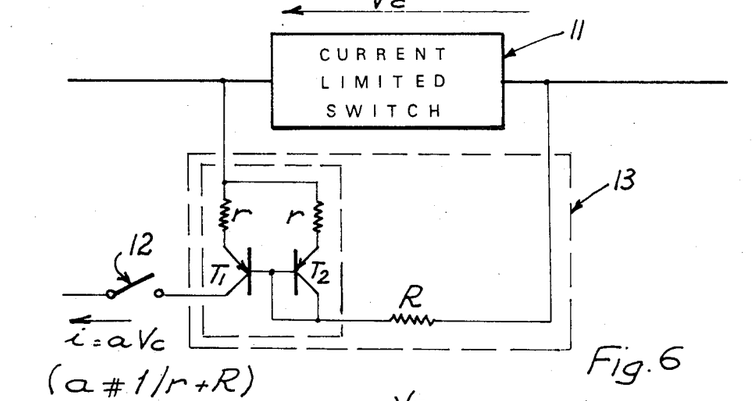
FIGS. 6 and 7 illustrate two embodiments of another object of the invention which is the process for measuring instantaneous power dissipated in the circuit to be protected.
Figure 7:
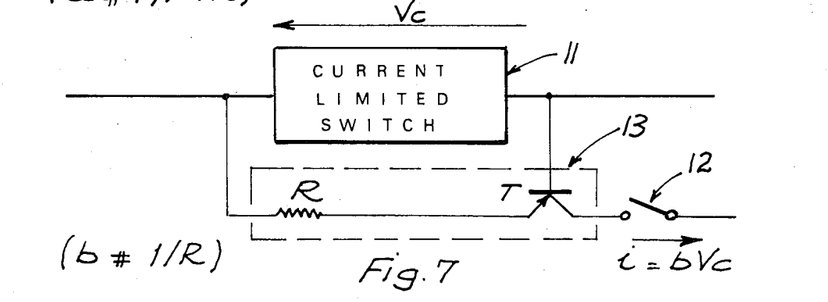

The circuits of FIGS. 6 and 7 show examples of power sensors.

In accordance with the invention, the power sensor 13 of FIG. 6 operates in the following way:

The voltage $V_C$ which is the voltage drop at the terminals of the current limited switch 11 is developed at the terminals of two series resistors R and r, except for the voltage of the threshold of the base-emitter diode of transistor T2. This threshold voltage is generally disregarded with respect to the value of $V_C$. The current i folowing through r, situated in the emitter of $T_2$, is substantially equal to $V_C/R+r$.

Device 22 formed of $T_1$, $T_2$ and the two resistors R is a "current mirror"; the result is that the current from the collector of $T_1$ is then equal to the current i proportional to $V_C$, so proportional to the instantaneous power dissipated in the switch through which the limitation current $I_M$ flows.

The power sensor 13 of FIG. 7 uses the equality of the collector and emitter currents of transistor T having a sufficient current gain. The emitter current is substantially equal to the ratio $V_C/R$ (except for the threshold voltage of the base-emitter diode).

Another essential characteristic of the invention resides in the method of connecting several current limited switches 11 in parallel, for increasing the switching capacity of the EPC.

The switches 10 of the EPC thus formed must equally share the total current flowing through this EPC. For switches formed from bipolar transistors, low value resistors in series in the emitters may be sufficient for providing the balanced distribution of the total current flowing through the EPC.

On the other hand, for switches formed from several power MOSFETs, the problem is not as simple. The surest way of providing equitable distribution of the dissipated powers is not to put the power components alone in parallel, as is practised in the prior art, but to associate with each of them its own maximum current control circuits. Since the limitation current may thus be regulated accurately for each section 11, the powers dissipated in each power component 10 forming the switch of the EPC are perfectly mastered and identical. This equitable distribution of the power dissipated in each of the sections 11 leads to a third essential characteristic of the invention which resides in the use of a single thermal protection device for the whole of the switches 10 used.

To this end, in accordance with the invention the thermal paths for discharging the energy dissipated in each switch 10 are similar.

In the case where identical thermal paths cannot be formed, thermal protection is provided for the component having the poorest thermal resistance for discharging the energy which it absorbs.

FIG. 5 already described shows a device in accordance with the invention; its operation is as follows:

The switch of the EPC is formed by connecting several sections 11 in parallel, identical sections each formed by a switch 10 of the FET type, a current sensor 1, an error amplifier 2 and a buffer 3.

The probe 21 for measuring the temperature $\theta_M$ is placed in the thermal path for discharge of the energy dissipated by the EPC, or by that of these switches 10 having the poorest thermal resistance.

Each section 11 receives the control signal from the status memory 6, which intervenes at the level of elements 1, 2 or 3 of the current limiting loop for controlling the enabling or disabling of the FET 10.

In the enabled mode, the current through the FET 10 may be between 0 and $I_M$. If this current is less than $I_M$ the FET is saturated, if this current is equal to $I_M$ the FET operates in linear mode for regulating the current which flows through it to the maximum value $I_M$.

As already mentioned, temperature protection is provided by elements 21, 16, 13, 12, 14, 15, 17 which allow the real temperature of the zone ZD to be simulated from:

(a) the measurement of the temperature at a point PP in the thermal path for discharging the energy dissipated at ZD (temperature probe 21 situated at PP and voltage output thermometer 16 associated with the FET of section n° 1 for example).

(b) measurement of the instantaneous power dissipated at ZD obtained by 12 and 13, (c) simulation of the characteristics of the thermal path between ZD and PP by the analog RC network 14.

As long as $\theta_{ZD}$ is less than the limit temperature $\theta$ max, the state of ECP corresponds to the state of the external control C transmitted by 6.

If $\theta_{ZD}$ reaches the fixed threshold $\theta$max, the output of switch 16 switches, which corresponds to the emission of an internal command for opening the switches 10 having priority over the external control C because of 9.

Moreover, this thermal protection is ensured complementarily by the specific design of the internal power supply circuits described hereafter:

Circuit 8 delivers the internal supply voltages to the EPC:

this circuit 8 permanently supplies the functions 6, 7 and 9 with power so as to ensure the permanent transmission of the control orders of the CEP.

the internal low level circuits of sections 11 and of the whole of the circuits providing the thermal control properly speaking 21, 16, 13, 12, 14, 15 and 17 are not supplied with power when the switch of the EPC is open so as to minimise consumption in this state (role of switch 20). Whenever the switch is caused to open, whether this is provided internally (action of the thermal protection) or through the external control C, the FETs are immediately disabled and the non permanent internal power supplies of the above listed circuits are cut off by switch 20 with a certain delay fixed by the timer 18, so as to maintain the accuracy of the analog process, as described above.

In the nominal operating mode, that is to say outside the case of thermal trip out, the state of switches 10 reproduces the state of the input control C which is processed by elements 7, 9 and 6. Element 7 ensures adaptation and filtering if required of the external input control C. After adaptation, this control allows the state of memory 6 to be positioned through circuit 9 which ensures the priority of the thermocontrol coming from 17 over the external control C. The state memorized at 6 is transmitted without delay to sections 11 when the control C or the thermal trip out control require opening of the switch; and with a delay determined by the timer 19, when through control C it is desired to close the switches 10.

The purpose of this timer 19 is to allow the internal power supply switched by 20 to be established for effective closure of switch 10.

The ECP shown in FIG. 5 uses N channel MOS-FETS.

Figure 8:
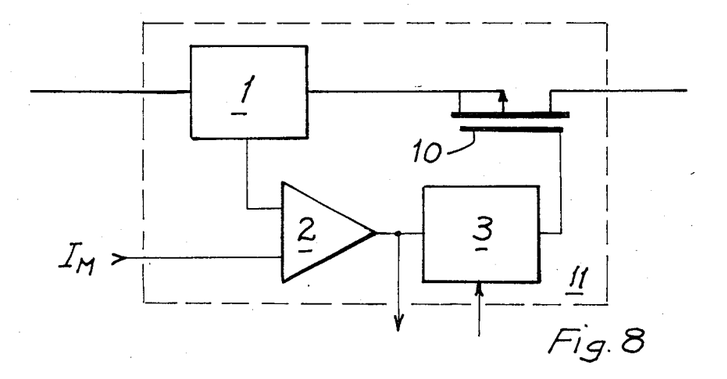
FIG. 8 illustrates one example of use of one or more power switches of the MOS P channel type.

It is possible to use P channel MOSFETs, and in this case, the sections 11 are formed as shown in FIG. 8.

The operation is identical to that of the sections using N channels.

What is claimed is:

1. Apparatus for measuring the temperature of an energy dissipating object or point to be protected, comprising an analog network representing a model of the thermal transmission between the object to be protected and the point where the temperature is measured, said analog network comprising a series of resistor-capacitor circuits connected in series, an electrical power source for supplying a voltage, a thermometer, a device for initializing said network arranged for, when applying, or applying again, the voltage of the power source, fixing said network in the state of the operating point representing the measured temperature, said initializating device comprising an operational amplifier the output of which is connected to said capacitors of said circuits in series with said network by means of a series of switches, and the two inputs of which are respectively connected to the terminals of the resistor of the first circuit of the series of circuits in series with the network, and means for delaying cut off of the electrical supply to the network and to the initializing device after disappearance of the dissipative phenomenon of the object to be protected in order for the real temperature of the object to become equal to the measured temperature.

2. The apparatus according to claim 1, wherein said switches are diodes.

3. The apparatus according to claim 2, wherein the positive input of said amplifier is connected to the associated terminal of said resistor of said first circuit of said network by means of a switch arranged for biasing the diodes in reverse at the end of the initialization.

4. The apparatus according to claim 1, wherein said switches are controlled switches.

5. Apparatus for measuring the temperature of an energy dissipating object or point to be protected, comprising an analog network representing a model of the thermal transmission between the object to be protected and the point where the temperature is measured, said object to be protected being a switching means of an electronic power controller arranged for controlling the supply of a load by means of an electrical power source operative for supplying a voltage as a function of an external control signal, said switching means being a current-limiting field effect transistor, a current sensing means, an error amplifier, a thermometer being disposed within a path for evacuating the thermal energy dissipated by said switching means, means for measuring the instantaneous power dissipated in said switching means being connected across said switching means to said analog network via a switch, said thermometer being connected to said network via a converting circuit, a device for initializing said network arranged for, when applying, or applying again, the voltage of the power source, fixing said network in the state of the operating point representing the measured temperature, and means for delaying cut off of the electrical supply to the network and to the initializing device after disappearance of the dissipative phenomenon of the object to be protected in order for the real temperature of the object to become equal to the measured temperature.

6. The apparatus according to claim 5 wherein said analog network is connected to an input of a comparator receiving on another input an instruction temperature and is connected by its output to an OR gate receiving said external control signal, the output of said OR gate being connected to a memory controlling the state of said switching means.

7. The apparatus according to claim 6, wherein an internal source supplies permanently said memory and said gate, all other elements of the device being supplied by said internal source via a switch controlled by said memory.

8. The apparatus according to claim 7, wherein control of the said switch by said memory is achieved by means of a timer when said memory controls the opening of said switching means.

9. The apparatus according to claim 5, wherein said switching means comprises a series of switches limited in current and connected in parallel.

10. The apparatus according to claim 9, wherein the paths for evacuating the thermal energy dissipated by said switches are similar.

11. The apparatus according to claim 9, wherein said thermometer is disposed within the path for evacuating the thermal energy dissipated by the switch of said series of switches having the most thermal resistance.

* * * * *